United States Patent [19]

Scholz

[11] Patent Number: 4,636,875

[45] Date of Patent: Jan. 13, 1987

[54] PLAYBACK DEVICE FOR A DIGITAL SIGNAL RECORDED BY A PLURALITY OF HEADS

[75] Inventor: Werner Scholz, Gehrden, Fed. Rep. of Germany

[73] Assignee: Telefunken Fernseh- und Rundfunk GmbH, Hanover, Fed. Rep. of Germany

[21] Appl. No.: 565,437

[22] Filed: Dec. 27, 1983

[30] Foreign Application Priority Data

Dec. 27, 1982 [DE] Fed. Rep. of Germany ....... 3248168

[51] Int. Cl.[4] .......................... H04N 5/95; G11B 20/22
[52] U.S. Cl. ........................................ 360/26; 360/32; 360/64; 360/36.2; 360/51; 358/339
[58] Field of Search ................. 360/32, 64, 36.2, 36.1, 360/38.1, 33.1, 26, 51; 358/335, 336, 337, 339

[56] References Cited

U.S. PATENT DOCUMENTS

| 3,763,317 | 10/1973 | Coleman | 358/339 |
|---|---|---|---|
| 3,921,132 | 11/1975 | Baldwin | 360/33.1 |
| 4,148,079 | 4/1979 | Horstmann | 358/337 |
| 4,313,129 | 1/1982 | Fukui | 360/38.1 |

FOREIGN PATENT DOCUMENTS

| 1272988 | 7/1968 | Fed. Rep. of Germany . |
| 2820041 | 11/1978 | Fed. Rep. of Germany . |
| 2341955 | 9/1977 | France . |
| 2072925 | 10/1981 | United Kingdom . |

OTHER PUBLICATIONS

U. Fiedler, et al., "Digital Video and Audio Recording on a Modified Video Cassette Recorder", *Professional Video*, (1982), pp. 10 and 12.
K. Nakano et al., "A New 8-Bit PCM Audio Recording Technique Using an Extension of the Video Track", *IEEE Transactions on Consumer Electronics*, vol. CE-28, (1982), pp. 241-249.
Radio Fernsehen Elektronik, vol. 26, pp. 21/22, Nov. 1977, p. 733.

*Primary Examiner*—Alan Faber
*Attorney, Agent, or Firm*—Spencer & Frank

[57] ABSTRACT

When recording a PCM signal, particularly an audio signal, on the oblique tracks of a magnetic tape, e.g. for example of a videorecorder, errors occur in the digital signal during the change of heads. These errors are removed in that, in the region where the scanning of the heads overlaps, phase matching of the bit clock pulses is effected, the bit patterns are matched and the number of bit clock pulses is increased or reduced before the next change of heads.

22 Claims, 15 Drawing Figures

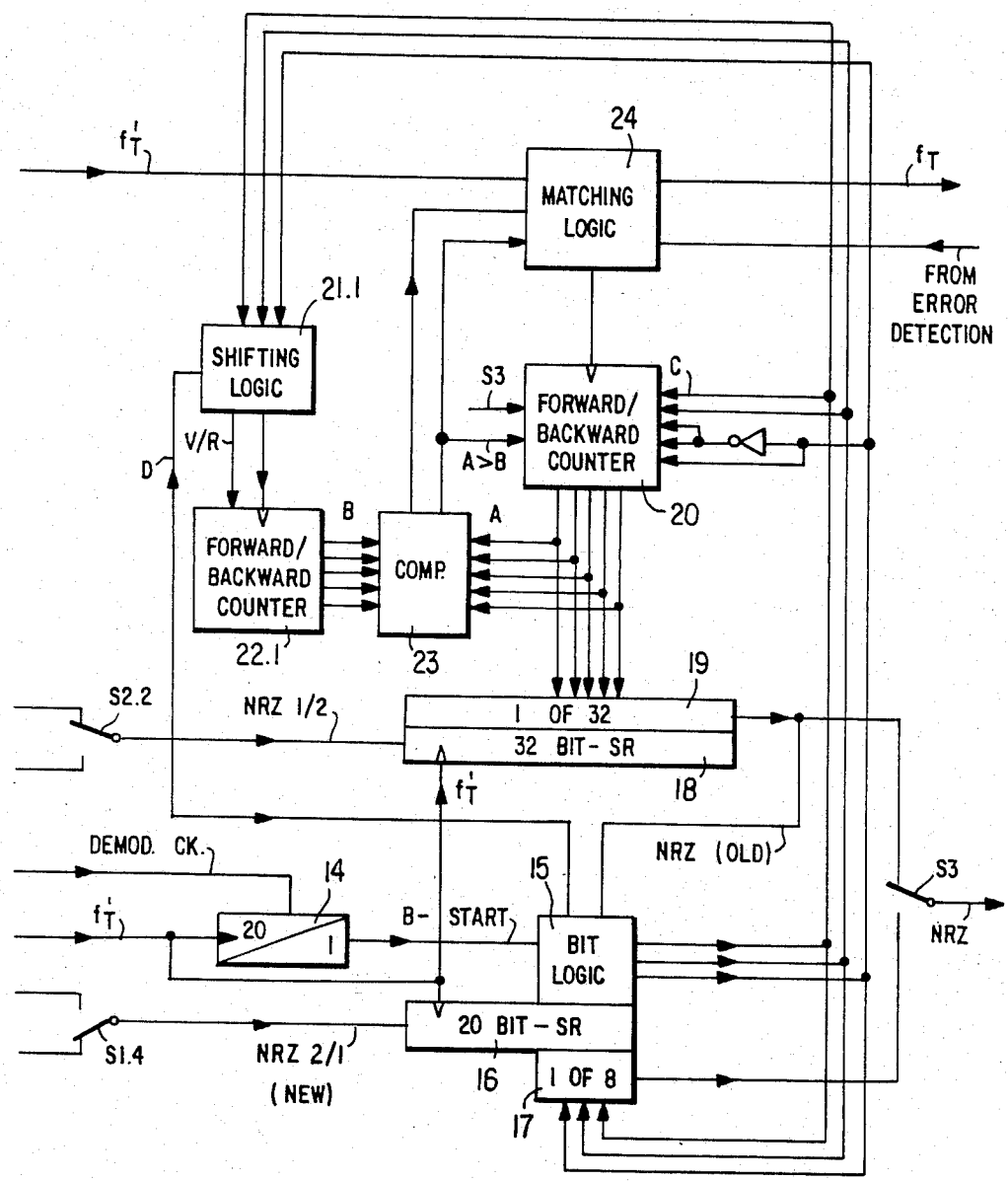
FIG. 5.1

FIG. 10
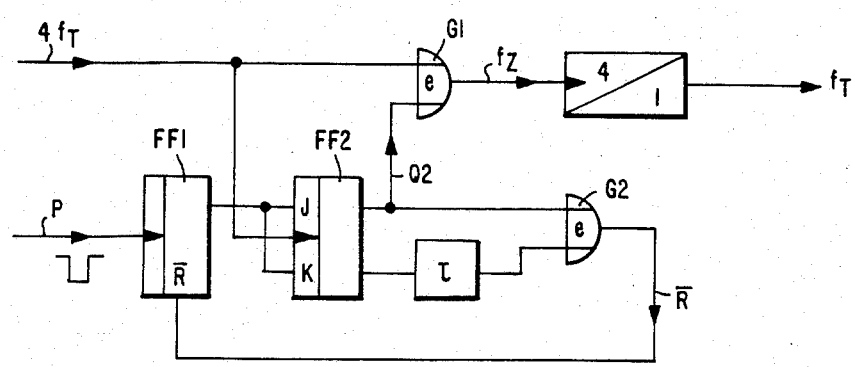
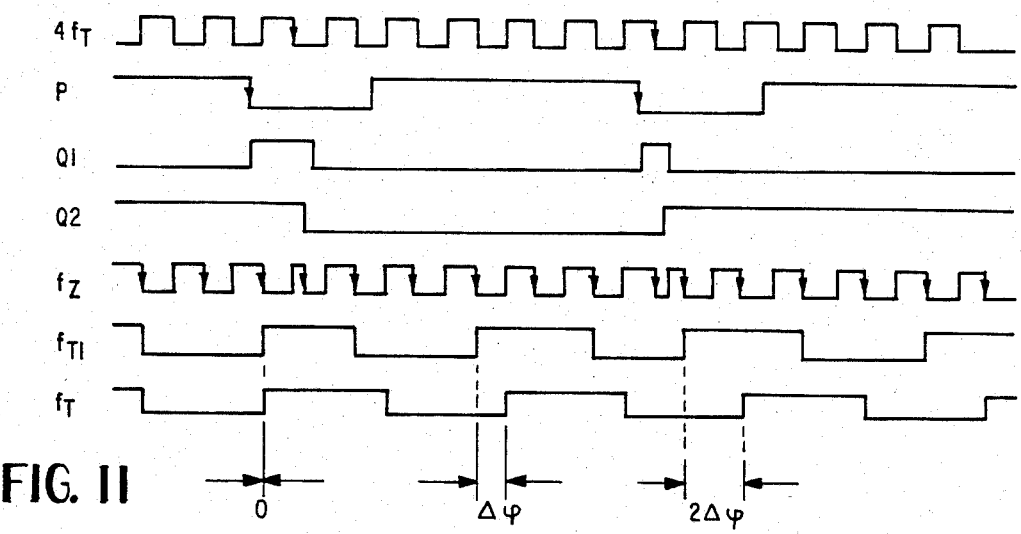
FIG. 11
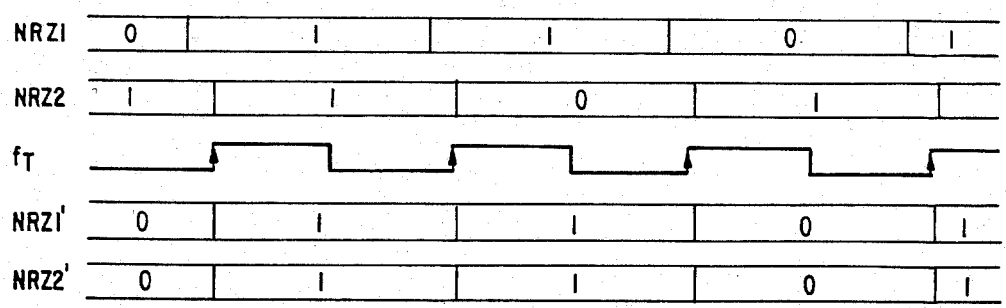
FIG. 12

PLAYBACK DEVICE FOR A DIGITAL SIGNAL RECORDED BY A PLURALITY OF HEADS

BACKGROUND OF THE INVENTION

The present invention relates to a method and apparatus for correcting errors in PCM signals which are recorded by a plurality of heads on time succession overlapping tracks by a plurality of rotating heads.

The following ways are known to record PCM signals on recorders employing rotating heads:

1. by way of PCM adapters for videorecorders: a PCM audio signal is here converted to a video signal and is recorded in the same manner as a video signal (FIG. 3).

2. by recording a PCM audio signal intended for a standard 8 mm video recording on an extension of the track produced by enlarging the head wheel loop angle (IEEE Transactions and Consumer Electronics, Vol. CE-28, No. 3, August, 1982, pages 241-249);

3. by recording a PCM video signal wherein each recording track is provided with a data block, which does not contain important data, so that the switching of heads can take place in that block (Professional Video, October, 1982, pages 10, 12).

Thus, no case involves continuous PCM signals, as they are scanned, for example, from a compact disc (CD) or are broadcast in PCM radio. To be able to record these continuous signals according to one of the conventional PCM recording methods, e.g. on a video recorder, they must first be converted, by time compression, into a signal which includes a time gap in which the switching of heads can take place during playback.

Up till now, there does not exist a way to play back without errors a PCM signal that has been recorded without special provisions for the switching of heads. In such case it would no longer be necessary for the PCM signal and the head wheel rotation to be coupled. This may be of advantage, for example, if a PCM audio signal is to be recorded simultaneously with a video signal and the PCM signal comes from a source which is not coupled with the video signal. Since the head wheel rotation must be coupled with the video signal, no coupling can then exist between the head wheel rotation and the PCM signal.

SUMMARY OF THE INVENTION

It is the object of the present invention to provide, during the playback of digital signals by electronic means, a compensation for the errors produced by the switching of heads between the two tracks.

The above object is accomplished according to the invention by a playback device for a digital signal recorded on a carrier by a plurality of heads in time successive, overlapping tracks, wherein the bit clock pulses of the digital signal in the overlap region are phase matched, the bit patterns in the overlap region are matched in such a manner that error-free switching takes place between the tracks, and any overlap errors are compensated by increasing or reducing the number of bit clock pulses between two head changes. Advantageous features of the invention are defined in the dependent claims.

BRIEF DESCRIPTION OF THE DRAWINGS

The present invention will now be explained in greater detail with the aid of the drawings wherein:

FIG. 5.1 is a block circuit diagram illustrating a modification of the solution of the present invention;

FIG. 10 is a block circuit diagram of a special configuration of a part of the circuit of FIG. 9;

FIGS. 11 and 12 are curves used to explain the operation of the phase matching circuit;

DETAILED DESCRIPTION OF THE PREFERRED EMBODIMENTS

Figure 1:
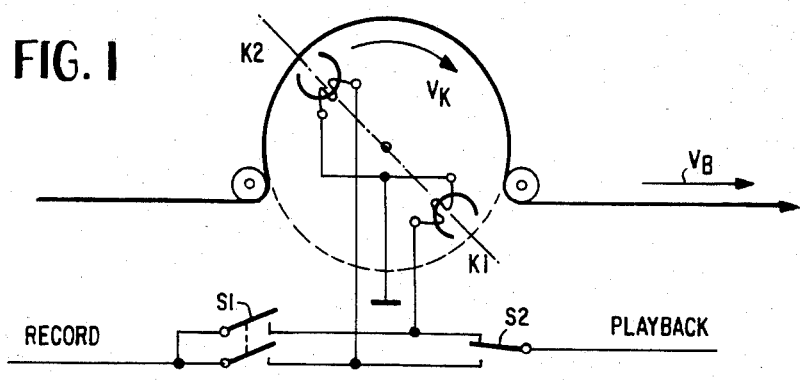
FIG. 1 is a schematic illustration of the known signal recording method with two heads and an overlap region.

The development of errors in the digital signal during the overlap period will be explained in connection with FIG. 1. During the recording process, switches S1 are closed so that the signal is fed in parallel to both heads K1 and K2 and thus both heads simultaneously record the same signal. In FIG. 2a, one bit is marked by dash-dot line 1. Thus during recording, this bit has the same time position at both heads K1 and K2.

In FIG. 2b, the bit marked by line 1 in FIG. 2a is scanned too early when head K2 scans the new track so that in the overlap period during switching, a number of bits corresponding to time region Δt is lost. In FIG. 2c, the marked bit on the new track is scanned too late by head K2 so that a signal repetition occurs here. These time overlap errors Δt are produced because the path travelled by heads K during playback generally does not coincide with the length of the recorded track. Deviations are the result of plastic tape deformations as well as differences in temperature between recording and playback. when tapes are exchanged, the overlap errors may become even greater due to deviations in head wheel diameter or tape tension.

In video recorders, switch S2 switches the system to the new head and the newly scanned track. This is permissible for a video signal because the line oscillator follows the slight phase jump with respect to the horizontal scanning period if the time constant of the control circuit is not too large.

However, for continuous PCM signals, as they are employed, for example, for digital records or in digital radio, such a phase jump is untenable. It would require a new block synchronization each time, and during this block synchronization time, the channel decoder would be unable to operate.

With known PCM adapters for video recorders, the PCM signal is compressed in time between the head changes so that no useful signal is transmitted in the head change region.

Figure 3:
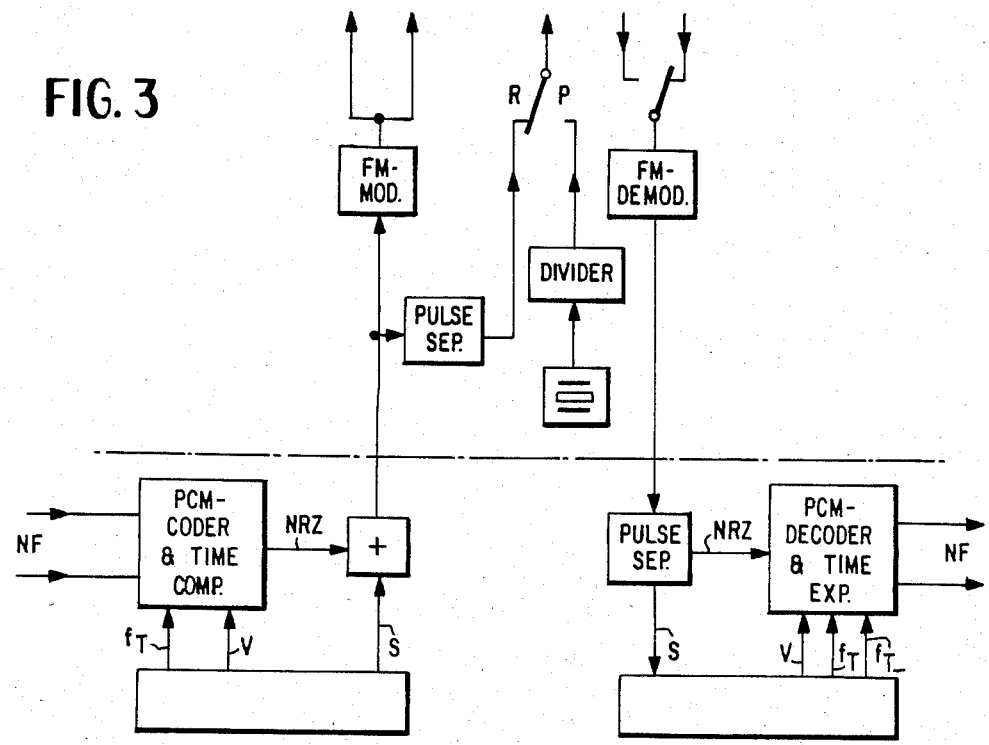
FIG. 3 is a block circuit diagram for the recording and playback of audio signals with the aid of the known PCM adapaters for video recorders.

FIG. 3 is a block circuit diagram for such an arrangement. Before the signal is fed to the input of the video recorder, synchronizing pulses S are added. No PCM signal is transmitted during the blanking periods. Recording takes place with normal frequency modulation.

During playback, the switching between heads K1 and K2 produces an uninterrupted signal at the input of the FM demodulator. After pulse separation, the PCM signal is fed to the PCM decoder where the time compression is also reversed. The clock pulse voltages required for the decoder are generated with the aid of the synchronizing signal.

The use of a digital transmission or line code (e.g. DM or biphase) instead of the frequency modulation of FIG. 3, saves bandwidth and permits reliable reestablishment of the clock pulse frequency necessary for decoding. This a particularly important point for transmission reliability.

Figure 4:
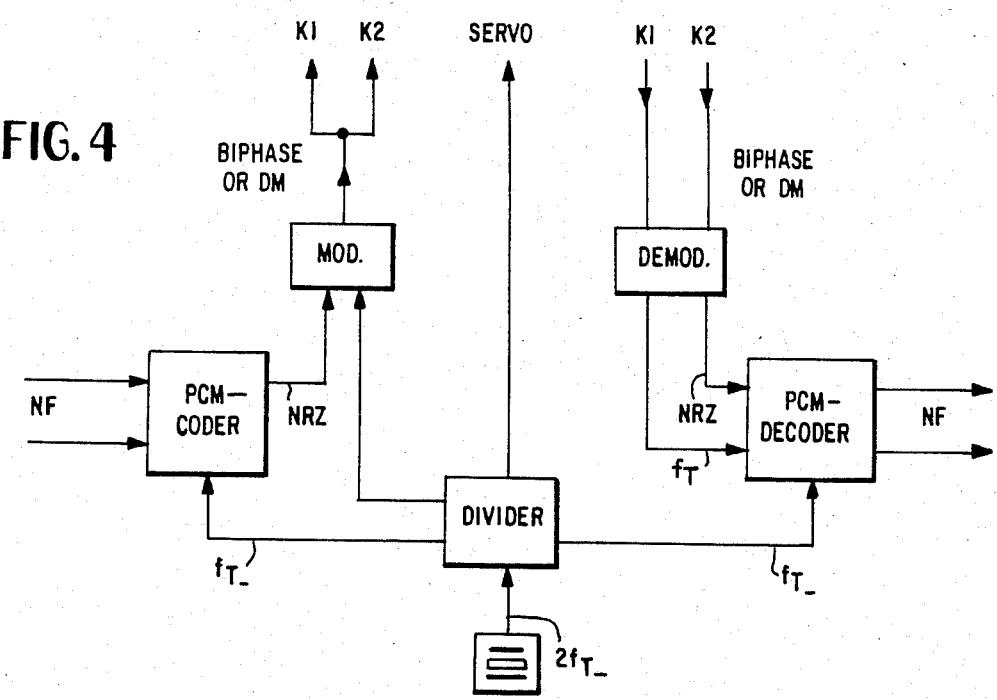
FIG. 4 is a basic block circuit diagram for recording and playback of a continuous digital signal according to the present invention.

FIG. 4 shows a recording and playback device in a recorder having two rotating heads K1 and K2. Within the demodulator circuit, which receives the scanned signals separately from the two heads, the present invention compensates for the errors occurring due to the change of heads. Then the remaining circuit components need not differ from the recording devices for a continuous track as required, for example, for a digital recorder. In the circuit according to FIG. 4, it is to be possible for the demodulator circuit to furnish the complete bit sequence and the complete associated clock pulse signal and no bit is present twice or is missing.

Figure 2:
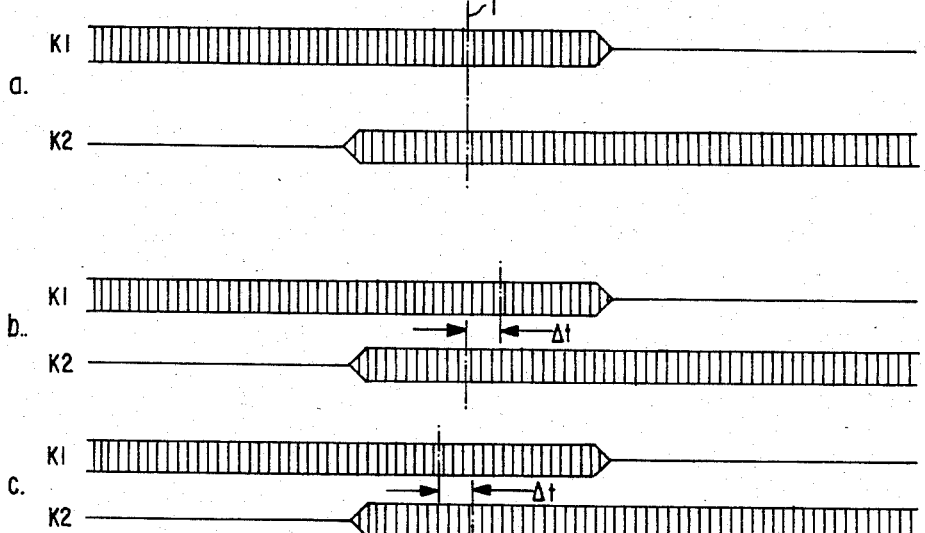
FIG. 2 is a basic illustration of the errors produced during playback by the switching of heads.

This can be accomplished with buffer memories if the overlap errors average out to zero. However, the considerations in connection with FIG. 2 show that the overlap errors produced by deviations between head path and track length always have the same sign. Thus scanning always produces too few bits, according to FIG. 2b, or too many bits, according to FIG. 2c. This cannot be handled by a state of the art buffer memory. The PLL (phase locked loop) phase regulating circuit, which produces the bit clock pulse from the transmission code, then, in the case of FIG. 2b, always furnishes less clock pulses than corresponds to the quartz oscillator frequency to which the speed of the head wheel is coupled. In the case of FIG. 2c, the PLL circuit always furnishes too many clock pulses. The quartz oscillator of FIG. 4 also furnishes the clock pulse for the digital-/analog converter of the PCM decoder.

In playback circuits with time error elimination, as they are used, for example, for audio signals, it is necessary to have available, for writing the individual bits into the memory of the PCM decoder, the clock pulse which has been regenerated from the signal and which follows the time fluctuations of the signal. Read-out takes place with a constant clock pulse. In order to prevent memory overflow, both clock pulse frequencies must coincide on the average. Moreover, not only the memory location address is controlled by counting circuits, all other processes in the PCM decoder are controlled by them as well.

Figure 5:
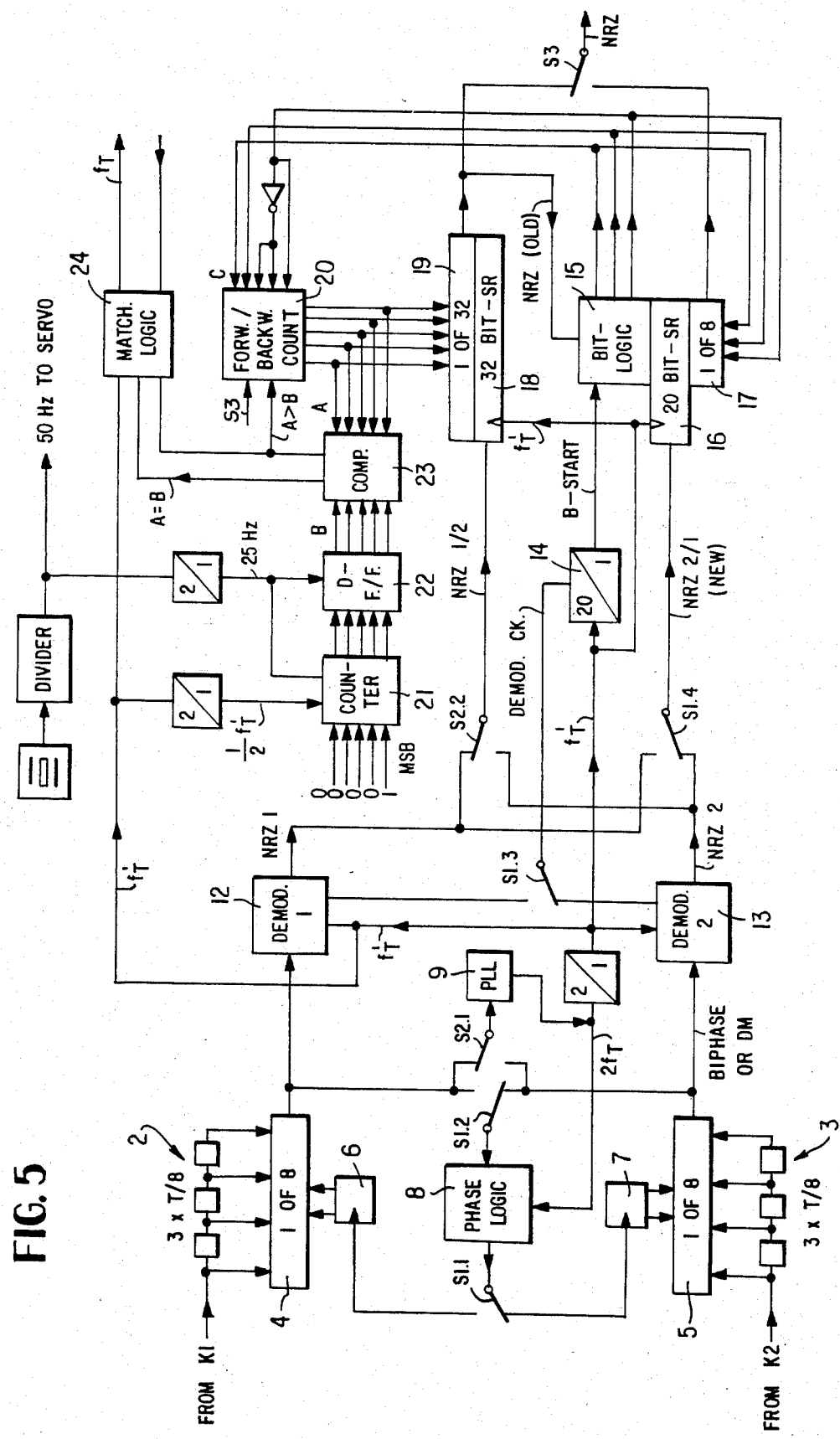
FIG. 5 is a detailed block circuit diagram of the demodulator of FIG. 4 according to the present invention.

FIG. 5 shows a digital circuit that can be used for the demodulator of FIG. 4. The circuit according to FIG. 5 thus solves the problem on which the present invention is based. However, the above-described measures may also be implemented completely in the region of the line code, i.e. upstream of the actual demodulator.

The circuit according to FIG. 5 is suitable for a biphase or a DM signal. The output signal of each head K1, K2 is fed to respective delay circuits 2, 3 having four taps. The differences of the delays between taps is T/8, where T is the duration of one bit period. The four signal phases made available are thus distributed uniformly over one period of twice the clock pulse frequency 2 fT. Each delay circuit includes a selector circuit 4, 5, whose output can be switched to one of the outputs of delay circuit 2, 3 depending on the binary number applied to the data inputs. The binary number is furnished by a respective 2-bit counter 6 or 7. Counter 7 of head K2, which begins with a new track, receives counting pulses from phase logic 8 as long as the signal phase is not sufficiently matched to the phase of the PLL oscillation 2 fT. At this time, PLL circuit 9 is still phase synchronized by the old track, i.e. by head K1.

Figure 7:
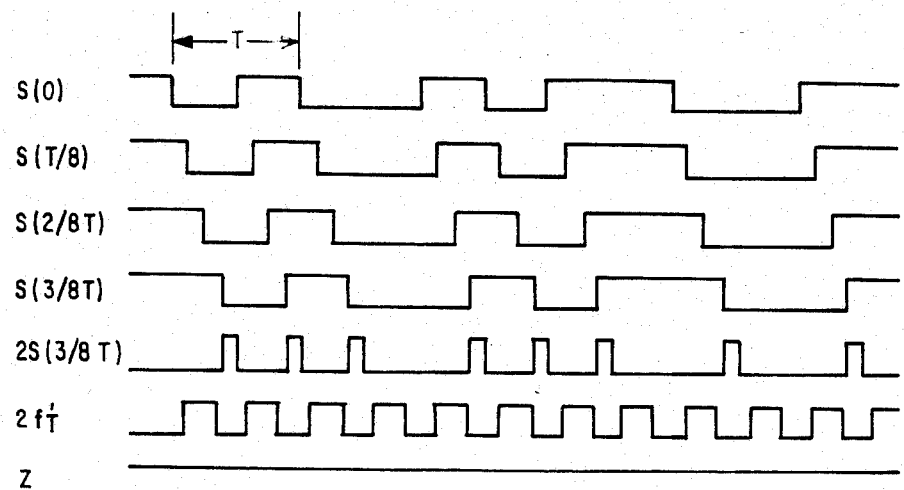
FIG. 7 is a block circuit diagram showing a special configuration of a part of the circuit of FIG. 5.
Figure 7:
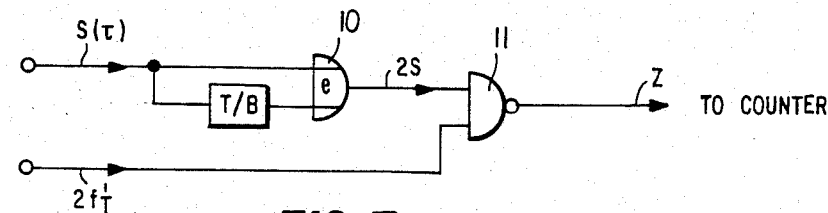

FIG. 7 shows an example for phase logic 8 of FIG. 5. EXOR [Exclusive-Or] gate 10 generates with every signal flank a positive pulse whose duration is approximately T/8. Depending on the phase position of these pulses with respect to the 2 fT oscillation, pulses will either appear at the output of AND gate 11 or not. As soon as no pulses appear any longer, phase matching is sufficient. The phase of the PLL oscillation 2 fT, which is fed to phase logic 8, is set accordingly.

After this phase matching of the new signal, demodulator 12 or 13, whichever is associated with this signal, is able, with the aid of the actual signal clock pulse fT, to correctly generate the NRZ [non-return to zero] signal. For the purpose of demodulation, a decision must be made as to whether or not the input signal needs to be shifted by one further half clock pulse period within demodulator 12 or 13. This 180° decision is made with the aid of an identification circuit. In this way it is assured that the NRZ signal is available for the new track at the demodulator output with a bit clock pulse which is in phase coincidence with the old signal. However, the bits of the two signals may be shifted with respect to one another by a whole number of bit clock pulses.

Demodulator 12 or 13 reports the completion of the 180° decision via switch S1.3 to counter 14 which counts 20 bit clock pulses. At the end of these 20 bit clock pulses, bit logic 15 is started. Bit logic 15 compares the signals in the last eight stages of 20-bit shift register 16 with the NRZ signal of the old track, which at this time is still switched through, via switch S3, to the output of the demodulator circuit. The delay by 20 bit clock pulses is necessary so that with the beginning of bit matching, shift register 16 is filled down to its last stage with the correctly demodulated NRZ signal. At the end of, for example, two further 16 bit periods, bit logic 15 furnishes a 3-bit binary number which indicates at which tap of 20-bit shift register 16 there exists signal coincidence with the switched-through NRZ signal of the old track. This tap is then fed via selector circuit 17 to the second input of switch S3. Then, switch S3 can switch between two bit periods from the old NRZ signal to the new NRZ signal, without thus producing interference in the subsequent channel decoder. No later than at this point in time, switch S2.1 must also be switched to the signal of the new track so that the PLL circuit will not be phase synchronized by the signal of the new track.

At the same time, the input of 32-bit shift register 18 is switched via switch S2.2 to the new NRZ signal. Each tap of shift register 18 may be fed, via a selector circuit 19 to the first input of switch S3. The five data inputs of selector circuit 19 are connected to the five outputs of a 5-bit forward/backward counter 20. Bit logic 15 is able to set counter 20 to one of the eight output values 12–19. With the control signal for switch S3, the forward/backward counter 20 is set to the number which corresponds to the tap of 20-bit shift register 16 in use at the present time. In this way, the selector circuit 19 of the 32-bit shift register 18 is set to the equivalent tap of the 32-bit shift register. No earlier than 20 clock pulse periods after switch S2.2 switches to the new signal, can switch S3 be set back to the output of selector circuit 19. However, this switching should take place at the earliest when no signal is being scanned any longer from the old track, so that switches S1.1, S1.2 and S1.3 can be switched simultaneously to that head K which at present is free of signals. The switching back of switch S3 to the output of selector circuit 19 is likewise accomplished between two bit periods so that the subsequent channel decoder is not interfered with thereby.

Figure 6:
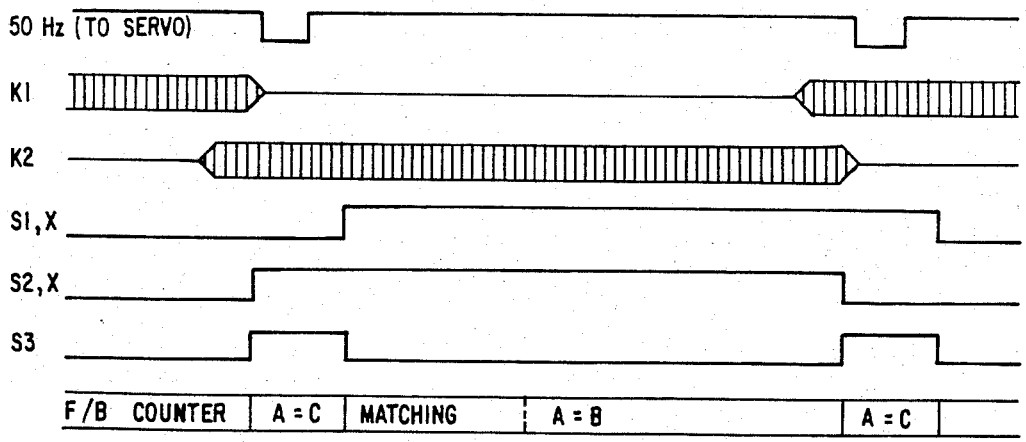
FIG. 6 shows curves that explain the operation of the circuit of the present invention.

FIG. 6 shows the time relationships between the signals of heads K1 and K2 and the control voltages for the various switches S. The value zero of the control voltages corresponds to the switch position shown in FIG. 5.

The circuit according to FIG. 5 includes a further 5-bit counter 21. The purpose of this counter is to count how many clock pulses PLL circuit 9 furnishes on the average between two head changes. If, for example, the amount of the overlap error is always <16 bits, then only the five LSB's of the counter result are of interest so that a 5-bit counter is sufficient for making the count although, for example at a bit rate of 2 Mbits/s, 40,000 bit clock periods lie between two head changes. This would be the desired number of clock pulses and a sign that no overlap error is present. For a count averaged over the head changes, the counting period must be doubled and the frequency fed to 5-bit counter 21 must be divided in half.

If the desired number of clock pulses is present, the selector circuit is set to the center of the 32-bit shift register. Since 40,000 can be divided by 32 without a remainder, the 5-bit counter must be set, with the leading edge of every other 50-Hertz pulse, to the value 16 (binary: 10,000). With the same pulse edge, the result of the preceding count is transferred to five D-flip-flops 22. This counting result is a measure of the presently existing average overlap error. If the count is 16, no overlap error is present. In the case of FIG. 2c, the result will be <16. In the case of FIG. 2c, it will be >16.

The number stored in the five D-flip-flops 22 indicates the basic shift which must be set with 32-bit shift register 18 so that during the next head change the new signal can be obtained as closely as possible to the center of the selection range of bit logic 15. In this way it is sufficient if a selection range of, e.g., 8 bits is provided for bit logic 15 while the overlap errors can here be a maximum of ±20 bits.

The setting of the basic shift according to FIG. 5 is suitable for a playback circuit according to FIG. 4 in which the number of bit clock pulses per head wheel revolution is known from the recording process and wherein a coupling between a desired clock pulse furnished by a quartz oscillator and the head wheel revolutions is provided during playback.

FIG. 5.1 shows another principle for setting the basic shift, wherein a coupling between the PCM clock pulses and the head wheel revolutions is not required during recording. The basic shift is here stored in a further forward/backward counter 22.1. The shifting logic 21.2 checks the binary number furnished by the bit logic 15. If the value of this binary number exceeds or falls below a prescribed average numerical range, then the shifting logic 21.1 causes the count of forward/backward counter 22.1 to be reduced or increased by one unit. Since sudden changes do not occur in the basic shift, this circuit constantly takes care that the selection range of the bit logic 15 is not exceeded. The following process can be used to assure that forward/backward counter 22.1 sets itself to the correct basic shift range after turn-on:

As long as the range has not yet been reached, the bit logic 15 does not detect coincidence between the signals in the overlap region. This is indicated by signal D which causes the forward/backward counter 22.1 to continue counting by one more in the same direction. In this way, the selection range of the bit logic 15 must be reached after 24 head changes at the latest.

After switch S3 has been switched back to the output of selector circuit 19, the compensation or matching logic 24 can come into action. Its task is to supplement the bit clock pulses missing from the desired number or to remove excess bit clock pulses. At the same time, this produces the basic shift required for the next head change. Moreover, the shift registers employed are prevented from overflowing with the overlap errors that always appear with the same sign.

Figure 8:
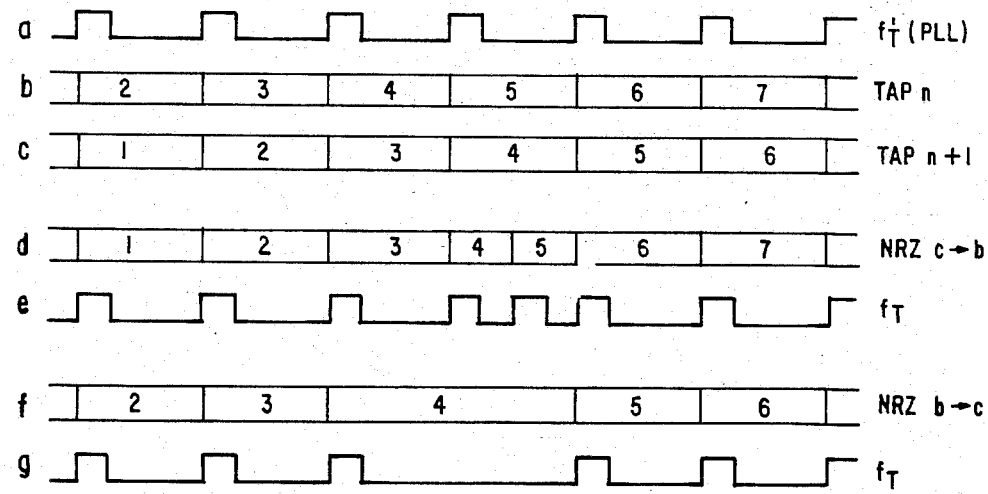
FIG. 8 shows further curves used to explain the operation of the present invention.

FIG. 8 shows the operation of the matching logic 24 with the aid of diagrams. FIG. 8a shows the clock voltage fT' obtained from the PLL circuit with which the bits are pushed through the shift registers. FIGS. 8b and 8c show numbered bits which are present at two adjacent taps of the 32-bit shift register.

FIGS. 8d and 8e show a case where, due to an overlap error, bits would get lost during simple switching of tracks, as shown in FIG. 2b. However, as described, switching was done here without the loss of bits. The replacement of the missing bits may then take place in the following manner somewhere before the next head change, with it being assumed that the signal according to FIG. 8c from tap n+1 of shift register 18 is present at the output of selector circuit 19.

Comparator 23 which compares the count A of forward/backward counter 20 with the contents B of memory 22 (FIG. 5) or, 22.1 (FIG. 5.1), determines that B>B. This is so because too few bits are transmitted between two head changes. The signal A >B=1 has the result that forward/backward counter 20 is set to count backward and a pulse is generated in the middle of two pulses fT'. This pulse is added to signal fT according to FIG. 8e. At the same time, it is fed to the counting input of forward/backward counter 20. With the leading edge of the pulse, the output of the selector circuit 19 is switched to the next lower tap n of shift register 18. FIG. 8d shows the signal at the output of the selector circuit. It can be seen that, except for the doubling of the bit rate, the NRZ signal and the associated clock pulse remain correct. Care can be taken that these compensation processes take place where no data bits need be written into the memory, e.g. during the transmission of the bit pattern for block synchronization. In this way it can be avoided that the memories of the channel decoder need be designed for the increased bit rate. The temporarily doubled clock pulse frequency produces no drawbacks for the counting circuits of the channel decoder. A compensation process for a bit can be performed, for example, whenever the error detection circuit reports an error-free block. The least number of clock pulses are required to process such a block.

FIGS. 8f and 8g show how the individual bit compensation processes must take place if too many bit clock pulses (B>A) are transmitted between two head changes, as shown in FIG. 2c. Comparator 23 then emits signal A >B=0. Forward/backward counter 20 is thus set to count forward. As soon as a pulse fT is given by compensation logic 24 to the counting input of counter 20, the selection circuit switches from tap n to tap n+1 of shift register 18. The respective pulse is blanked during clock pulse signal fT'. The result of this is shown in FIGS. 8f and 8g. This compensation process as well should not produce interference in a digitally operating channel decoder.

Figure 13:
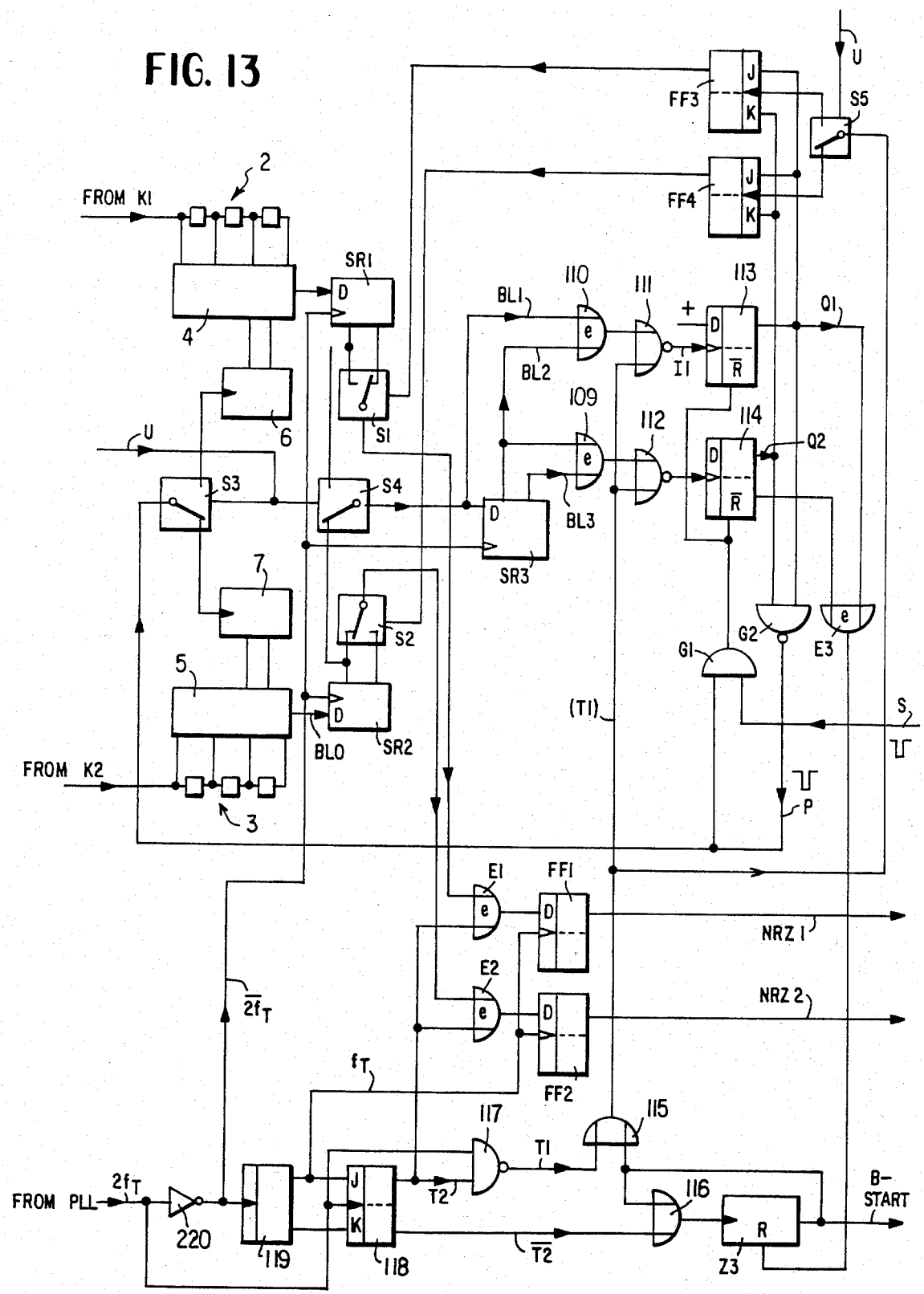
FIG. 13 is a block circuit diagram of a phase matching circuit according to the invention.
Figure 14:
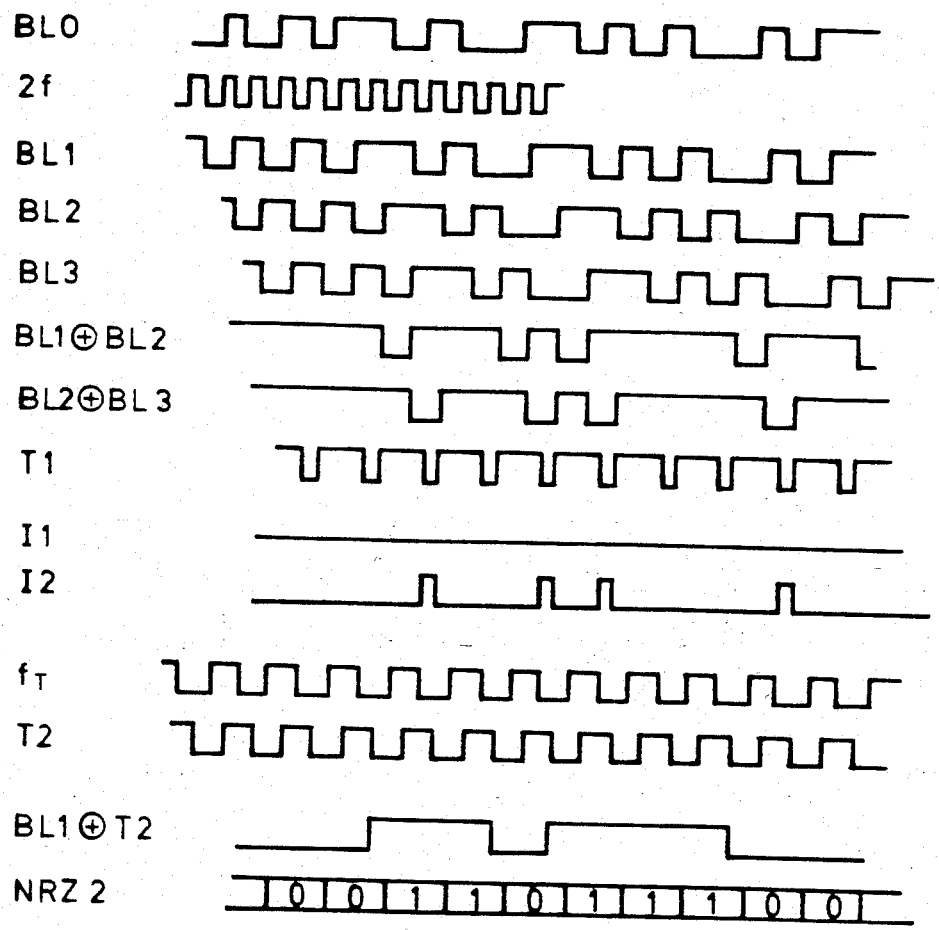
FIG. 14 shows a few voltage curves of the phase matching circuit of FIG. 13.

As can be seen from the description of FIG. 5, phase matching of the signals is necessary in the overlap region for interference-free switching of the signals from the two heads. This description includes a basic circuit as it can be used for a biphase signal as well as for a DM signal. FIG. 13 shows a phase compensation circuit which is of advantage, in particular, for processing a biphase level signal BL. FIG. 14 shows several voltage paths within this circuit.

In the circuit of FIG. 13, the phase logic is replaced by circuit components which are required in any case for the demodulator circuit. The criterion for the correct phase position is the error-free operation of the demodulator circuit over a given period of time. If this period of time is fixed at ≧20 bit periods, counter 14 of FIG. 5 can be omitted. At the end of the ≧20 error-free bit periods it is not only determined that the phase compensation is sufficiently accurate it is also certain that the shift register of the bit comparison circuit 16 of FIG. 5 has been loaded with the correctly demodulated signal. Phase matching, setting of the demodulator circuit and start delay for the bit logic thus do not operate consecutively but simultaneously. Due to the savings in time, more attempts to realize error-free signal switching can be made if there is signal interference in the overlap region. This reduces the probability for errors in switching.

The actual phase matching of the bit clock pulses of the respective new track to the clock pulse oscillation of the PLL which passes without phase shift is here effected, as in FIG. 5, by a selection of certain delay stages for the biphase signals coming from the heads. Here again circuit components 2, 4, 6 and 3, 5, 7, respectively, serve this purpose. It will be shown later that phase matching between the bit clock pulse and the continuously oscillating PLL clock pulse can also be effected by a phase shift of the clock pulse oscillations.

The demodulator circuit to be described now, which simultaneously controls the phase matching process, is suitable for both types of phase matching.

The positions of switches S3, S4, S5 shown in FIG. 13 correspond to those at the beginning of the overlap period during a change from head 1 to head 2. Signal BLO of the new track of head K2 present at the output of the selector circuit is fed to a data input of a first 2-bit shift register SR2. Writing in is effected at double the clock pulse frequency 2fT obtained with the aid of a PLL circuit from the signal of the old track. Shift register SR2 furnishes the biphase signal with two different lateral positions which differ by one-half bit period. One of these signals is fed via a switch S2 to the actual demodulator which includes an EX-OR gate E2 and a flip-flop FF2. At the other input of EX-OR gate E2 there appears a clock pulse T2. Flip-flop FF2 is timed by the clock pulse frequency fT of the old track from head K1. As can be seen in FIG. 14, fT and T2 are shifted with respect to one another by one-quarter bit period. This demodulator furnishes a correct NRZ signal only if the correct phase with respect to the clock pulse frequency fT of the old track has been set with the aid of counter 7 and switch S2.

An identification circuit takes care of setting switch S2 and counter 7. One output of shift register SR2 is connected via a switch S4 with the D input of a further 2-bit shift register SR3. With the aid of this shift register SR3, three signals BL1, BL2, BL3, are generated, which each differ in their time position by one-half bit period. Signal BL1 leads to one input of an EX-OR gate 110, signal BL2 leads to a further input of EX-OR gate 110 and to one input of EX-OR gate 109, and signal BL3 leads to a further input of EX-OR gate 109. With the aid of two NOR gates 111, 112, the output voltages of the two EX-OR gates 109, 110 are compared with a pulse voltage T1. The voltage curves for the case of a correct phase position of signal BL0 are shown in FIG. 14. Output signals I1 and I2 of NOR gates 111, 112 constitute the actual phase identification. The phase of BL0 is correct if one of the two signals I1, I2 remains at logic "0". The position of switch S2 depends on which one of the two signals is comprised of pulses.

To be sure that the detection of the correct phase setting was not inadvertently simulated by interference, observations must be made over a longer period of time whether one of the two signals remains at logic "0". This is done with a counter 23 which counts whether this state remains in existence over a certain number of bit periods. This number may correspond to the length of the shift register used in the bit logic. This constitutes a useful utilization of the waiting period required at this point to completely fill the shift register employed with the correct NRZ signal at the beginning of the bit compensation process.

A phase setting process now takes place as follows:

At the beginning of the overlap period, two D-flip-flops 113, 114, whose clock pulse inputs receive the voltages I1 and I2, hereinafter called I pulses, are reset by a starting pulse S. One output Q1 of flip-flop 113 is connected to one input of an EX-OR gate E3 as well as to one J-input of each of flip-flops FF3 and FF4. The second input of EX-OR gate E3 is connected with the inverting output of flip-flop 114. The noninverting ouput Q2 of flip-flop 114 is connected with a NAND gate G2 as well as with the K inputs of flip-flops FF3 and FF4. The output of NAND gate G2 leads to an input of NAND gate G1 as well as, via a switch S3, to the clock pulse input of counter 7 or, in another position of switch S3, to the clock pulse input of counter 6. The output of EX-OR gate E3 leads to the reset input of counter Z3. The outputs of gates G2 and E3 are intially logic "1". Counter Z3 is kept in the reset state.

At the first pulse I1 or I2, respectively, that arrives, the Q output of the respective D-flip-flop 113 or 114, respectively, becomes logic "1". Counter Z3 is released for counting. As soon as an I pulse appears also at the clock pulse input of the other D-flip-flop during the counting period of counter Z3, counter Z3 is reset again via EX-OR gate E3. NAND gate G2 furnishes a descending pulse edge P to counter 7. This switches the selector circuit to the next tap of the delay chain 3. If at this tap as well, I pulses appear at the inputs of D-flip-flops 113, 114, the process is repeated. This continues until, during the counting period of counter Z3, I pulses appear at only one of D-flip-flops 113, 114. Counter Z3 then furnishes a rising pulse edge which initially takes care that no further I pulses can be produced. For this purpose, the output of counter Z3 is connected via an OR gate 115 with one input of each of OR gates 111, 112. Moreover, at this point in time, the bit logic according to FIG. 5 may be started. The position of the two D-flip-flops 113, 114 has already been transmitted at the beginning of each counting cycle of counter Z3 to one of flip-flops FF3 and FF4, respectively. For the evaluation of the signals from head 2, the write-in clock pulse is fed via switch S5 to flip-flop FF4. Thus the correct tap of shift register SR2 has been selected via switch S2, so that during the entire counting period the correct NRZ signal is present at the output of flip-flop FF2. The setting of counter 7 and of switch S2 remains unchanged at least to the completion of the switching process at the next head change. The switching process from head 2 to head 1 takes place in an entirely corresponding manner.

Figure 9:
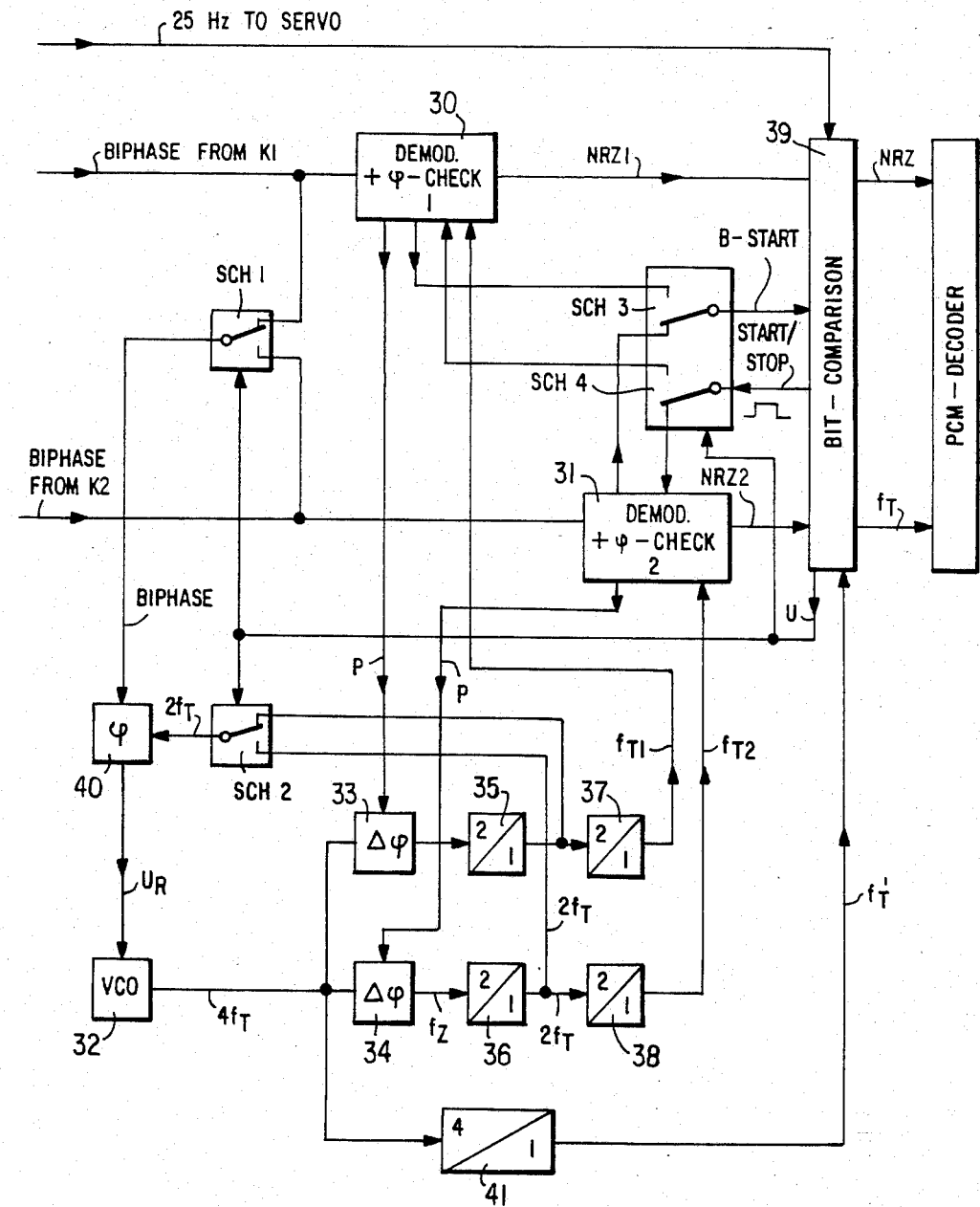
FIG. 9 is a block circuit diagram of an embodiment of a further feature of the present invention.

FIG. 9 shows an embodiment according to another feature of the present invention. According to this embodiment the phase matching of the bit clock pulses is effected in such a manner that at the beginning of every new track, the phase of the clock pulse oscillation at the output of a frequency divider is set so that it is suitable for perfect demodulation of the PCM signal (biphase signal) of the new track.

The clock pulse oscillations are here matched in phase to the signal coming from heads K1 and K2. However, the output signals of the demodulation circuits (NRZ1 and NRZ2) associated with heads K1 and K2 here no longer have the same clock pulse phase. However, this phase shift can easily be removed when the two NRZ signals are written into the shift registers of the bit comparison circuit at the clock pulse frequency of signal fT', which continues to oscillate without shifts in phase past the head changes.

In FIG. 9, a biphase signal at bit rate fT comes alternatingly from both heads K1 and K2 of a videorecorder.

The two signals are fed directly to the inputs of each one of demodulation circuits 30 and 31. These demodulation circuits 30 and 31 simultaneously make a phase check at the beginning of each new track. Via switch Sch1, one of the two signal inputs can be connected with the first input of a phase comparison circuit 40. The phase comparison circuit 40 is part of a PLL circuit which additionally includes the following components:

1. a VCO oscillator 32 which oscillates at a frequency of f0=4·fT;

2. two circuits 33 and 34 for generating phase shifts of $\Delta\phi = \frac{1}{8}$ fT period. These circuits will be explained in connection with FIGS. 10 and 11;

3. two further frequency dividers 35 and 36 having a dividing ratio of 2:1;

4. a switch Sch2 which feeds the output signals of frequency dividers 35 and 36 selectively to the second input of phase comparison stage 40 at frequency 2fT. The phase of the respective oscillation 2fT that has been selected to be switched through, is regulated by the PLL circuit into a defined position with respect to the respective biphase input signal.

The two oscillations 2fT are fed to two further frequency dividers 37 and 38 having a dividing ratio of 2:1. Frequency dividers 37 and 38 furnish clock pulse frequency fT1 for demodulator 30 and clock pulse frequency fT2 for demodulator 31.

Outside of the overlap period, the respective incoming biphase signal and the signal 2fT effective for the respective demodulator are fed to phase comparison stage 40. The signal fT generated from 2fT is set in phase in such a manner that the demodulator generates the correct NRZ signal. At the beginning of each new track, the other demodulator is used to attempt demodulation for the purpose of making a phase check.

With every unsuccessful demodulation attempt, demodulator circuit 30, 31 emits a pulse P which shifts the phase of FT1, FT2 by $\frac{1}{8}$ period. As soon as the correct phase position has been found, switch Sch3 starts the bit comparison circuit 39 (B-start).

If bit comparison is successful, all switching may be directed to the signal of the new track.

If no bit coincidence is found, the following alternatives exist:

(a) the bit comparison circuit again initiates the phase comparison process via switch Sch4, since it must be assumed that the phase setting is not optimum; or (b) the bit comparison circuit continues to restart itself until bit pattern coincidence has been found. However, during this entire time, the phase comparison circuit remains active so that a new phase matching process can be started at any time until the bit comparison is completed.

FIG. 9 shows case b. The leading edge of the start/stop signal, which is derived, for example, from a head engagement signal (25 Hz) furnished by a servo circuit, initiates the phase matching process. The trailing edge of the signal terminates the entire signal matching process as soon as the bit comparison was successful or the overlap period is completed. In this way, correct-bit head switching is realized with extremely high certainty within the overlap period of, e.g., 1 ms. If, for example due to a long dropout, such switching should be impossible, the 25 Hz signal furnished by the servo circuit forces a switch to the signal of the new track shortly before the end of the overlap period and simultaneously actuates the trailing edge of the start/stop pulse so that the signal matching process is also terminated.

With correct-bit head switching, the two new input signals for phase comparison stage 40 have already been brought into the correct phase position with respect to one another. Therefore, this switching has no effect on oscillator 32 nor on dividers 35 to 38 and 41 connected thereto.

Three clock pulse voltages at frequency fT are generated from frequency 4·fT of oscillator 32. Two of these clock pulse voltages (fT1 and fT2) are each matched to the signal phase of the biphase signal coming from heads K1 and K2. The third clock pulse voltage fT' continues to oscillate without phase shifts. It serves to write the two NRZ signals into the shift registers of the bit comparison circuit with the same bit clock pulse. In this way, the phase shift between the two NRZ signals is set in the desired manner to a whole number multiple of the bit duration. For bit comparison, there then exist the same conditions as with the use of the circuits according to FIGS. 5 and 13.

FIG. 10 shows a circuit for generating a phase change of $\Delta\phi = \frac{1}{8}$ fT period in clock pulse signals fT1 and fT2. The operation of this circuit is evident from the signal curves of FIG. 11.

Signal P, whose generation is shown, e.g., in FIG. 13, indicates that a new phase stage must be set. With each descending edge of signal P, the output of flip-flop FF1 is set to 1 (Q1=1). This causes output Q2 of flip-flop FF2 to be switched by the next descending edge of the 4·fT signal. Due to these switching processes, signal curve fZ appears at the output of EX-OR gate G1. The oscillation train 4·fT is changed in polarity each time. Due to the delay of flip-flop FF2, an additional half-wave is generated during each polarization change. The circuit fulfills its purpose even if the development of an additional half-wave is prevented by delay time compensation. This would merely mean a reversal of the sign of the phase shifts.

At every change in level at the output of flip-flop FF2, gate G2 generates a reset pulse for flip-flop FF1 so that the circuit is again in a state ready to receive the next P pulse.

Thus, each P pulse shifts the oscillation fT1 by precisely $\frac{1}{8}$ of its period duration. The last two lines in FIG. 11 show how the phase of fT1 has shifted with respect to fT' after two P pulses.

Depending on the position of clock pulse signals fT1 and fT2, respectively, each one of the two NRZ signals can take on eight different phase positions with respect to the clock pulse signal fT' which continues to oscillate without phase shifts.

FIG. 12 shows how the two NRZ signals are made identical in phase with respect to the bit period. This is done while the signals are written into the shift registers of the bit comparison circuit with the common clock pulse signal fT'. Since the changes in level of fT', fT1 and fT2 are generated from the same starting oscillation 4fT, the unequivocal writing in of the NRZ signals with the common clock pulse fT' is assured in any case. The two lowermost lines of FIG. 12 show signals NRZ1' and NRZ2' which have been written into two D-flip-flops with the common clock pulse voltage fT'.

The two signals have here simultaneously been broght into bit coincidence.

Depending on the magnitude of the overlap error, these signals may, however, also be shifted with respect to one another by a plurality of bit periods. To determine such a shift and compensate for it is the purpose of the bit comparison circuit.

The phase and bit clock pulse matching according to the present invention for PCM signals scanned by a plurality of heads is not limited to recording of a signal on interrupted tracks but can also be used for recording on parallel tracks.

The above-described process makes possible PCM audio recordings alone or in addition to a video recording. In the latter case, bit rate and PCM recording amplitude must be selected in such a manner that the spectrum of the PCM line code does not produce interference in the FM video recording. In contradistinction to a known proposal (IEEE Transactions and Consumer Electronics, Volume CE-28, No. 3, August, 1982, pages 241-249), no change in the video recording standard is necessary here.

If the PCM signal is an audio signal which is recorded together with a video signal, with the PCM clock pulse being coupled with the horizontal scanning frequency of the video signal, then the embodiment according to FIGS. 9 to 12 has the advantage that the phase position of the demodulated PCM signal NRZ1, NRZ2 remains unchanged with respect to the video signal. Bit clock pulse and possibly also block synchronizig signal can be used for video signal processing without prior phase correction. The phase position between the PCM clock pulse and the video signal is then also not dependent upon the toleeances of different delay members.

It will be understood that the above description of the present invention is susceptible to various modifications, changes and adaptations, and the same are intended to be comprehended within the meaning and range of equivalents of the appended claims.

What is claimed is:

1. In a playback device for an uninterrupted digital signal recorded on a carrier by a plurality of heads in time successive, overlapping tracks, said playback device including a pair of playback heads for reading the recorded digital signal in adjacent tracks, and circuit means responsive to the output signals from both of said heads during the period of overlap for providing a control signal for changing the one of said heads which is to provide the output signal for the playback device to the head associated with the new track; the improvement wherein said means for providing a control signal includes: circuit means for matching the phase of the bit clock pulses of the digital signals in the overlap region of two adjacent tracks; circuit means for matching the bit patterns in said overlap region such that error-free switching takes place between the tracks; and circuit means for providing compensation for overlap errors by increasing or reducing the number of bit clock pulses between two head changes.

2. Device as defined in claim 1 wherein said circuit means for matching the phases of the bit clock pulses includes means for conducting the digital signals from the respective playback heads through respective adjustable delay members.

3. Device as defined in claim 1 wherein said means for matching the phases of the bit clock pulses includes means for shifting the phase of a clock pulse oscillation (fT1, fT2) which has been regenerated from the digital signal with respect to a further regenerated clock pulse oscillation (fT') which continues to oscillate through the head changes without phase shifts.

4. Device as defined in claim 3, wherein, in order to regenerate the PCM clock pulse, a VCO oscillator in a PLL circuit oscillates at a whole number multiple of the bit rate.

5. Device as defined in claim 4, wherein: first and second frequency divider means, through which the output oscillation of the VCO oscillator can be returned to the phase comparison stage of the PLL circuit as a reference value, are provided; and switch means are provided for selectively connecting an output of said first or said second frequency divider means to said phase comparison stage of the PLL circuit.

6. Device as defined in claim 5, wherein: said digital signal is recorded in a line code; separate respective demodulators are provided for the signals from the respective playback heads; said switch means is positioned so that said first frequency divider means furnishes the reference oscillation for said phase comparison stage of the PLL circuit; and an output of said first frequency divider means furnishes the clock pulse for the respective said demodulator for the demodulation of the PCM signal coming from one of the playback heads in a line code.

7. Device as defined in claim 6, wherein: an output of said second frequency divider means is connected to furnish the demodulation clock pulse for the other of said demodulators; and means are provided for, at the beginning of a new track within the overlap period for both tracks, changing the phase of the output voltage of said second frequency divider means by influencing its manner of counting until the correct demodulation of the digital signal of the new track with the output voltage of this frequency divider is accomplished in said other of said demodulators.

8. Device as defined in claim 7, wherein means are provided for causing both respective inputs of said phase comparison stage to be switched simultaneously to the signal of the new track and to the output of the frequency divider whose phase has been set for this signal in response to a signal indicating that said correct demodulation of the digital signal of the new track has occurred.

9. Device as defined in claim 1 wherein said means for matching the phases carries out the phase matching in steps.

10. Device as defined in claim 9, wherein the step size is T/8, with T being the duration of one bit period of the digital signal.

11. Device as defined in claim 10, wherein, for performing the phase matching, four setting stages spaced at T/8 are provided and an additional setting is possible for a shift by T/2.

12. Device as defined in claim 1, wherein: said digital signal is recorded in a line code; said playback device includes a demodulator circuit for demodulating the line code; and the phase matching of the bit clock pulses is synonymous with the phase setting required for the purpose of error-free demodulation of the digital signal between the digital signal arriving in the line code (biphase, DM) and a locally generated clock pulse oscillation.

13. Device as defined in claim 12, wherein the criterion for the correct phase setting is the error-free operation of the demodulator circuit over a given number of bit clock pulses or level changes of the data signals.

14. Device as defined in claim 1 further comprising means for determining when said means for matching the phases has provided the correct phase match, and for thereafter generating a start signal for said means for matching the bit patterns (B start).

15. Device as defined in claim 1, wherein: said digital signal is recorded in a line code; said playback devices includes a pair of demodulator circuits for demodulating the line code, with each demodulator circuit having its input connected to a respective one of said playback heads; and said means for matching the bit patterns includes shift register means into which the demodulated signals (NRZ1, NRZ2) are written with a common clock pulse oscillation (fT').

16. Device as defined in claim 15, wherein: said shift register means includes respective shift registers, each having a plurality of taps, for the respective demodulated signals; and said means for matching the bit patterns includes means for selecting the tap to be used for switching to the new track by comparing the signals at the taps of the shift register for the new track with the evaluated signal of the old track.

17. Device as defined in claim 15, further comprising: means for providing a start signal for said means for matching the bit patterns when phase matching is completed; and, means for restarting said means for matching the phases if no bit pattern coincidence is found by said means for matching the bit patterns.

18. Device as defined in claim 15, wherein said circuit means for matching the phases remains active until the matching of the bit patterns is completed by said means for matching the bit patterns.

19. Device as defined in claim 1, wherein the digital signals from said playback heads are fed to respective shift registers, each having a plurality of taps associated with its respective stages; and said means for providing compensation includes circuit means for determining the respective overlap error (21, 21.1) and a memory means for storing the address for the shift register tap to be set so that with the next head change the signal of the new track is obtained from a limited tap region of the associated shift register (16).

20. Device as defined in claim 19, wherein means are provided for, between two head changes, setting the signal from the track then being played back stepwise to the shift register tap which corresponds to the address deposited in said memory means (22, 22.1).

21. Device as defined in claim 20, wherein each setting step comprises a change to an adjacent shift register tap, while simultaneously the bit rate of the NRZ signal and the clock pulse frequency (fT) are doubled or cut in half once.

22. Device as defined in claim 21, wherein in one data block of the NRZ signal not more than one setting step is performed.

* * * * *